United States Patent [19]

Krusche et al.

[11] 3,956,332

[45] May 11, 1976

[54] FAST, BROWN SULFUR DYESTUFFS AND PROCESS FOR THE PREPARATION THEREOF

[75] Inventors: Erwin Krusche, Frankfurt am Main; Joachim Ribka, Offenbach (Main); Eberhard Stier, Frankfurt am Main, all of Germany

[73] Assignee: Cassella Farbwerke Mainkur Aktiengesellschaft, Germany

[22] Filed: June 26, 1974

[21] Appl. No.: 483,373

[30] Foreign Application Priority Data

Sept. 21, 1973 Germany............................ 2347537

[52] U.S. Cl..................................... 260/282; 8/54.2
[51] Int. Cl.²....................................... C07D 487/04
[58] Field of Search......................... 260/282, 281 S

[56] References Cited
UNITED STATES PATENTS

| | | | |
|---|---|---|---|
| 1,878,986 | 9/1932 | Schmidt............................ | 260/282 |
| 1,888,624 | 11/1932 | Eckert.............................. | 260/282 |
| 2,766,244 | 10/1956 | Broullard.......................... | 260/281 |

FOREIGN PATENTS OR APPLICATIONS

| | | | |
|---|---|---|---|
| 6,505,435 | 11/1965 | Netherlands....................... | 260/282 |

*Primary Examiner*—Raymond V. Rush
*Assistant Examiner*—Mark L. Berch
*Attorney, Agent, or Firm*—Connolly and Hutz

[57] ABSTRACT

Dyestuffs obtained by sulfurization of at least one compound of the formula

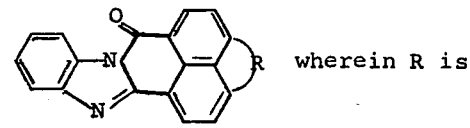 wherein R is

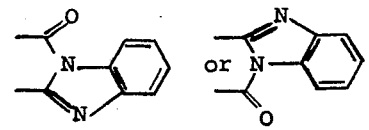

19 Claims, No Drawings

FAST, BROWN SULFUR DYESTUFFS AND PROCESS FOR THE PREPARATION THEREOF

The invention relates to valuable, novel sulfur dyestuffs of yellow-brown to red-brown shades, which are clearly superior to the previously known sulfur dyestuffs of comparable shades with respect to their fastness properties and simplicity of preparation.

The commercial reddish-brown sulfur dyestuffs are to some extent difficult to prepare (multiple stage) or have moderate light fastness properties. A further disadvantage thereof is their instability with respect to sodium hydrosulfite and, depending on the oxidation agents employed, a shade deviation in the oxidative after-treatment of fresh dyeings.

Sulfur dyestuffs C.I. Nos. 53,710; 53,720 and 53,730 prepared by sulfurization of hydroxy and amino derivatives of phenazine, show, for example, a strong sensitivity toward sodium dithionite (over-reduction) and have a fastness to light of only 3 to 4. Dyestuffs C.I. Nos. 53,810 and 53,830, which have better fastness properties, are obtained by the sulfurization of benzooxazinone or benzothiazinone derivatives, which are obtainable only by complicated, multi-stage syntheses.

There exists, therefore, a need for yellowish to reddish-brown sulfur dyestuffs having good fastness properties which may be prepared from easily available starting materials.

It has now been freund that brown, especially reddish-brown, sulfur dyestuffs with very good over-all properties may be obtained if both cis-trans-isomers of formulas II (C. I. No. 71,100, Indanthrene maroon RR) and III (C. I. No. 71,105, Indathrene brilliant orange GR), which are genericaly embraced by formula i wherein R is as stated below, are subjected, individually or mixed, to various customary sulfurization processes.

it in chlorosulfonic acid and reacting with sulfur or a sulfur-yielding agent at 10° to 120°C., preferably at 40° to 100°C., for 1 to 40 hours, preferably 1 to 20 hours. For this reaction, the chlorosulfonic acid is preferably introduced in a weight amount of 7 to 15 times the weight of the starting material. The sulfur yielding agents may, for example, be salts of orthothio carbonic acid and trithio carbonic acid, di- or polythio acids, di- or polythionic acids or thiosulfuric acid, particularly its sodium and potassium salts, hydrogen sulfide and particularly the sulfur halides such as sulfur dichloride, sulfur dibromide, disulfur dichloride, disulfur dibromide and mixtures of these compounds such as the products resulting from reacting halogen and sulfur. Commercial disulfur dichloride is particularly preferred. The quantity of the sulfurization agent may be varied within wide limits, whereby the shades of the dyestuffs obtained may be influenced considerably.

If elementary sulfur is utilized as the sulfurization agent, about 2 to 15 gram atoms, and preferably 4 to 12 gram atoms, may be introduced. In the utilization of sulfur-yielding agents such as disulfur dichloride, 0.5 to 12 moles, and preferably 1 to 8 moles, per mole of the starting dyestuffs II and III, may be introduced.

In this connection, it is basically immaterial whether the sulfurization agent is added before or after dissolving the dyestuff. A modification of the process consists of using compositions consisting of chlorosulfonic acid and sulfuric acid with different contents of sulfur trioxide under the same or similar sulfurization conditions, wherein, depending on the solubility of the sulfurized starting dyestuff, up to 70% by weight of the chlorosulfonic acid may be replaced by 100% sulfuric acid or oleum with up to 20% free $SO_3$.

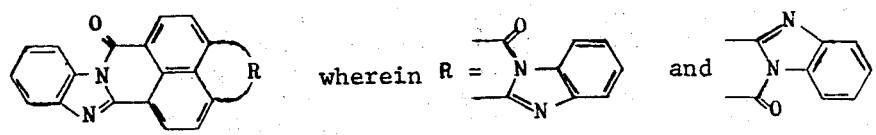

I

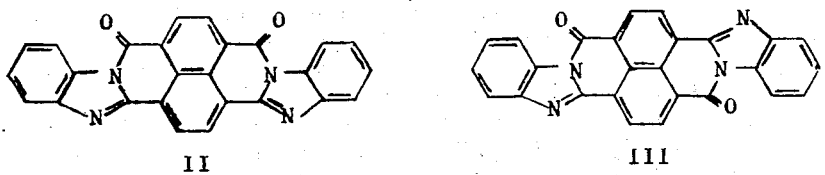

II                III

The starting materials of formulae II and III are produced on a large scale and therefore need not be prepared especially for the sulfurization. In manufacture, they are obtained as a mixture in quantity proportions of about 40% II to 60% III. Since the market takes up disproportionately larger quantities of dyestuff III found of II, there results an excess of the latter, for which no meaningful use has been known up to the (C.I. It is therefore of particular significance that this product (C.I. utilized, according to this Indanthrene for the preparation of valuable genericaly dyestuffs. I The starting material may be sulfurized by dissolving In the use of Indanthrene maroon RR (formula II) as the starting material and depending on the type and amount of the sulfurizing agents, as well as on the change of the reaction temperature and the duration of reaction, there are obtained reddish-brown sulfur dyestuffs whose color tint extends from a clear reddish to a violet tint and thus encompasses almost the entire sector of the reddish-brown sulfur dyestuffs. The novel products dissolve in aqueous sodium sulfide solution with and without the addition of sodium hydrosulfite in a translucent red color and green dichroism and dye cellulose fibers to full reddish-brown tints. Depending on the reaction conditions, the dyestuffs obtained from formula II contain 2 to 8 mercaptan groups and 0.1 to 4 atoms chlorine per mole of said starting material.

Indanthrene brilliant orange GR (formula III), sulfurized in accordance with the invention, yields orange-brown sulfur dyestuffs, whose color tones, depending on the quantity of sulfurizing agents, range from a clear orange to a dull reddish-brown shade. The physical and coloristic properties correspond to those sulfur dyestuffs obtained from Indanthrene maroon RR.

It is also possible to sulfurize in the above-described manner the technically produced mixture of both isomers (C.I. No. 71,110, Indanthrene scarlet GG), in lieu of the individual dyestuffs II and III, in order to produce intermediate shades.

The sulfur dyestuffs, obtained in accordance with the above-described process, are novel. As contrasted with the known commercial products of comparable shade, they have good fastness to light, improved fastness to wet processing and stability against the effects of alkali metal dithionite, e.g., sodium hydrosulfite.

The sulfur dyestuffs of this invention may be successfully employed for dyeing plant fibers in accordance with the customary processes known for the dyeing with sulfur dyestuffs. With reducing agents, such as sodium formaldehyde sulfoxylate, sodium dithionite or preferably sodium sulfide, they are converted into a soluble leuco compound, which goes on the fibers. By exposure to air or oxidation with oxidizing agents such as hydrogen peroxide, bichromate or the like, the leuco compound reconverts to the insoluble form.

The dyeings obtained in the above manner have the following advantages over those of comparable shade, obtained with the known dyestuffs: no impairment of color tone and of fastness properties during after-treatment with oxidizing agents, e.g., bichromate, acetic acid or hydrogen peroxide, constant color tone for a prolonged time (fastness to shifting) and uniform dyeing of the fibers in piece finish-dyeing, i.e., good uniformity.

The dyestuffs of this invention may also be converted in a manner known per se into water-soluble sulfur dyestuffs in that they are reacted with aqueous sodium hydrogen sulfite or with aqueous sodium sulfite. These water-soluble dyestuffs may then be applied to the textile goods in accordance with all dye processes known for soluble sulfur dyestuffs.

The following examples illustrate the present invention.

EXAMPLE 1

Into 309 g chlorosulfonic acid are introduced, within 2 hours, 30.9 g (0.075 mole) Indanthrene maroon RR with occasional cooling to maintain a maximum of 25°C and the resulting mixture is stirred to obtain complete solution for another hour without cooling. The brownish-red solution is mixed in one pouring with 20.2 g disulfur dichloride (corresponding to 2 moles per mole starting dyestuff) and heated within 30 minutes to 40° to 45°C. After a 16-hour stirring at 40° to 45°C, the reddish-brown mixture, cooled down to 30°C, is added dropwise to 2.5 l water, the temperature rising to 45° to 50°C. The recovered dyestuff is washed neutral with water and dried. It dyes cellulose fiber from an alkali sulfide solution reddish-brown tints having good wet and light fastnesses. If the above-described 20.2 g disulfur dichloride are replaced by 10.1 g (corresponding to 1 mole) or 12.7 (corresponding to 1.25 moles), as well as by 15.2 g (corresponding to 1.5 moles per mole starting dyestuff) disulfur dichloride, there are obtained clearer reddish-brown tints in the finish dyeing of these products from alkali metal sulfide.

EXAMPLE 2

Into 309 g chlorosulfonic acid are introduced 30.9 g (0.075 mole) Indanthrene maroon RR and the mixture is stirred in accordance with Example 1. The dyestuff solution is mixed in one pouring with 30.4 g disulfur dichloride (corresponding to 3 moles per mole starting dyestuff) and within 30 minutes heated to 40° to 45°C. After a 16-hour stirring at 40° to 45°C, the reddish-brown mixture, which was cooled to 30°C, is worked up in accordance with Example 1. The dyestuff dyes cellulose fibers from an alkali metal sulfide solution reddish-brown tints having a good wet and light fastness. The color shade is somewhat duller blue than that of the product described in Example 1. If the 30.4 g disulfur dichloride employed in this Example are replaced by 40.5 g (corresponding to 4 moles per mole starting dyestuff), there is obtained in the finish dyeing of this product a considerably duller blue shade than that described in Example 1.

EXAMPLE 3

Into 309 g chlorosulfonic acid are introduced 30.9 g (0.075 mole) indanthrene maroon RR and this mixture is stirred in accordance with Example 1. The dyestuff solution is mixed in one pouring with 12.7 g disulfur dichloride (corresponding to 1.25 moles per mole starting dyestuff) and heated to 60°C within 45 minutes. After a 16-hour stirring at 60°C, the reddish-brown mixture, cooled to 30°C, is worked up in accordance with Example 1. The dyestuff dyes cellulose fibers reddish-brown tints having good wet and light fastnesses. The color shade is distinctly clearer than that of the product described in Example 1. If the 12.7 g disulfur dichloride, employed in this example, are replaced by 15.2 g (corresponding to 1.5 moles) or 20.2 g (corresponding to 2 moles), as well as by 30.4 g (corresponding to 3 moles per mole starting dyestuff) disulfur dichloride, there are obtained similar or duller shades in the finish dyeing of these products.

EXAMPLE 4

Into 309 g chlorosulfonic acid are introduced 30.9 g (0.075 mole) indanthrene maroon RR and this mixture is stirred in accordance with Example 1. The dyestuff solution is mixed in one pouring with 40.5 g disulfur dichloride (corresponding to 4 moles per mole starting dyestuff) and heated within 45 minutes to 60°C. After a 16-hour stirring at 60°C, the reddish-brown mixture, cooled to 30°C, is worked up in accordance with Example 1. The dyestuff dyes cellulose fibers reddish-brown tints having good wet and light fastnesses. The color share is considerably duller than that of the dyestuff described in Example 3. If the 40.5 g disulfur dichloride used in this example are replaced by 60.7 g (corresponding to 6 moles per mole starting dyestuff), there is obtained in the finish dyeing of this product a very similar shade.

EXAMPLE 5

Into 309 g chlorosulfonic acid are introduced 30.9 g (0.075 mole) indanthrene maroon RR and this mixture is stirred in accordance with Example 1. The dyestuff solution is mixed in one pouring with 12.7 g disulfur dichloride (corresponding to 1.25 moles per mole starting dyestuff) and heated to 80°C within 45 minutes. After a 16-hour stirring at 80°C, the reddish-brown mixture, cooled to 30°C, is worked up in accordance with Example 1. The dyestuff dyes cellulose fibers orange-brown tints having good wet and light fastnesses. If the 12.7 g disulfur dichloride used in this example is replaced by 15.2 g (corresponding to 1.5 moles) or 20.2 g (corresponding to 2 moles) as well as by 30.4 g (corresponding to 3 moles per mole starting dyestuff) disulfur dichloride, there are obtained in the finish dyeing of these products duller yellow shades.

EXAMPLE 6

Into 309 g chlorosulfonic acid are introduced 30.9 g (0.075 mole) indanthrene maroon RR and this mixture is stirred in accordance with Example 1. The dyestuff solution is mixed in one pouring with 40.5 g disulfur dichloride (corresponding to 4 moles per mole starting dyestuff) and heated to 80°C within 45 minutes. After a 16-hour stirring at 80°C, the reddish-brown mixture, cooled to 30°C, is worked up in accordance with Example 1. The dyestuff dyes cellulose fibers reddish-brown tints having good wet and light fastnesses. The color shade is distinctly duller than that of the dyestuff described in Example 5. If the 40.5 g disulfur dichloride used in this example are replaced by 60.7 g (corresponding to 6 moles per mole starting dyestuff) disulfur dichloride, there is obtained in the finish dyeing of this product a distinctly redder blue shade.

EXAMPLE 7

Into a composition of 309 g chlorosulfonic acid (corresponding to a 15-fold weight quantity of the dyestuff) and 27 g disulfur dichloride (corresponding to 4 moles per mole starting dyestuff) are introduced 20.6 g (0.05 mole) indanthrene maroon RR within one hour without cooling with a temperature rise to 30°C. Within 30 minutes, it is heated to 50° to 55°C and stirring is conducted for 24 hours at 50° to 55°C. The reddish-brown mixture, cooled to 30°C, is worked up in accordance with Example 1. The dyestuff dyes cellulose fibers reddish-brown tints having good wet and light fastnesses. The color shade approximates that of the dyestuff described in Example 2. If the 309 g chlorosulfonic acid, employed in this example, is replaced by 206 g (corresponding to the ten-fold quantity of dyestuff) chlorosulfonic acid and the 27 g by 54 g (corresponding to 8 moles per mole starting dyestuff) disulfur dichloride there is obtained in the finish dyeing of this product a very substantially duller and yellower shade.

EXAMPLE 8

Into a composition of 216 g chlorosulfonic acid (7-fold weight quantity of the dyestuff) and 93 g 100% sulfonic acid (3-fold weight quantity of the dyestuff) are introduced within 2 hours 30.9 g (0.075 mole) Indanthrene maroon RR with occasional cooling to maintain a maximum of 25°C and this mixture is stirred for one hour without cooling. The dyestuff solution is mixed in one pouring with 20.2 g disulfur dichloride (corresponding to 2 moles per mole starting dyestuff) and heated within 30 minutes to 40° to 45°C. After a 16-hour stirring at 40° to 45°C, the reddish-brown mixture, cooled to 30°C, is worked up in accordance with Example 1. The dyestuff colors cellulose fibers violet-tinged, reddish-brown shades having good wet and light fastness. The color shade is distinctly bluer than that of the dyestuff described in Example 1.

EXAMPLE 9

Into a composition of 115 g chlorosulfonic acid and 100% sulfuric acid (5-fold weight quantity of the dyestuff for each) are introduced within 2 hours 30.9 g (0.075 mole) Indanthrene maroon RR with occasional cooling to maintain a maximum of 25°C and this mixture is stirred one hour without cooling. The dyestuff solution is mixed in one pouring with 20.2 g disulfur dichloride (corresponding to 2 moles per mole dyestuff) and heated within 30 minutes to 40° to 45°C. After a 16-hour stirring at 40° to 45°C, the reddish-brown mixture, cooled to 30°C, is worked up in accordance with Example 1. The dyestuff colors cellulose fibers reddish-brown tints having good wet and light fastness. The color shade is distinctly bluer red than that of the dyestuff described in Example 8. If the composition of chlorosulfonic acid and sulfuric acid used in this example is replaced by a composition of 93 g chlorosulfonic acid (3-fold weight quantity of the dyestuff) and 216 g 100% sulfuric acid (7-fold weight quantity of the dyestuff), there is obtained in the finish dyeing of this product a clearer and redder shade.

EXAMPLE 10

Into 309 g chlorosulfonic acid are introduced 30.9 g (0.075 mole) Indanthrene maroon RR in accordance with Example 1 and the mixture is stirred. The dyestuff solution is mixed within 30 minutes with 28.8 g sulfur (corresponding to 12 g atoms sulfur per mole dyestuff) and the mixture is stirred for 30 minutes at room temperature until an extensive solution of the sulfur is achieved. This mixture is heated within 30 minutes to 40° to 45°C. After a 16-hour stirring at 40° to 45°C, the reddish-brown mixture, cooled to 30°C, is worked up in accordance with Example 1. The dyestuff colors cellulose fibers violet-tinged, reddish-brown shades having good wet and light fastnesses. The color shade is very similar to that of the dyestuff described in Example 8.

EXAMPLE 11

Into 206 g chlorosulfonic acid are introduced within 2 hours 20.6 g (0.05 mole) Indanthrene brilliant orange GR with occasional cooling to maintain a maximum of 25°C and this mixture is stirred for one hour, without cooling, to obtain complete solution. The brownish-red solution is mixed in one pouring with 20.2 g disulfur dichloride (corresponding to 3 moles per mole starting dyestuff) and heated within 30 minutes to 40° to 45°C. After a 16-hour stirring at 40° to 45°C, the reddish-brown mixture, cooled to 30°C, is added dropwise to 1.7 l water. The dyestuff, worked up in accordance with Example 1, colors cellulose fibers orange-brown tints having good wet and light fastnesses. If the 20.2 g disulfur dichloride used in this example are replaced by 13.5 g (corresponding 2 moles) or by 6.8 g (corresponding to 1 mole per mole starting dyestuff) disulfur dichloride, there are obtained in the finish dyeing of these products clearer or considerably clearer shades than those of the dyestuff described in this example.

EXAMPLE 12

In accordance with Example 11, 20.6 g (0.05 mole) indanthrene brilliant orange GR are introduced into a composition of 144 g chlorosulfonic acid (7-fold weight quantity of the dyestuff) and 62 g 100% sulfuric acid (3-fold weight quantity of the dyestuff) and this mixture is stirred. The dyestuff solution is mixed in one pouring with 13.5 g disulfur dichloride (corresponding to 2 moles per mole starting dyestuff) and heated within 30 minutes to 40° to 45°C. After a 16-hour stirring at 40° to 45°C, the reddish-brown mixture, cooled to 30°C, is worked up in accordance with Example 11. The dyestuff colors cellulose fibers orange-brown tints having good wet and light fastnesses. The color shade is considerably duller red than that of the dyestuff described in Example 11.

EXAMPLE 13

In accordance with Example 11, 20.6 g (0.05 mole) Indanthrene brilliant orange GR are introduced into 206 g chlorosulfonic acid and the mixture is stirred. The dyestuff solution is mixed within 30 minutes with 19.2 g sulfur (corresponding to 12 g atoms sulfur per mole dyestuff), this mixture is stirred, to obtain extensive solution of the sulfur, for 30 minutes at room temperature and heated within 30 minutes to 40° to 45°C. After a 16-hour stirring at 40° to 45°C, the reddish-brown mixture, cooled to 30°C, is worked up in accordance with Example 11. The dyestuff colors cellulose fibers orange-brown tints having good wet and light fastnesses. The color shade is distinctly duller red than that of Example 12 and considerably duller red than that of the dyestuff described in Example 11.

The following example serves for illustrating the conversion of the above-described novel sulfur dyestuffs into water-soluble products.

EXAMPLE 14

There are stirred a mixture of 650 g of a dyestuff paste obtained in accordance with Example 3, with a content of 119.3 g of the raw dyestuff containing 6% free sulfur (corresponding to 112.2 g (0.2 mole) pure dyestuff) and 1594 ml water for 6 hours. The dyestuff dispersion obtained is standardized by the addition of 1 N sodium hydroxide to a pH of 6.0, mixed with 101 g sodium sulfite (4 moles per mol pure dyestuff) and stirred in an air stream for 8 hours at 25°C. At this point the pH rises to 11.4. The air stream is then interrupted and the mixture heated to 40°C within 30 minutes and stirred one hour at this temperature.

The continuation of the reaction is controlled by the withdrawal of samples at intervals of two hours. The reaction is completed when a folded filter, through which a sample diluted with water to a 7-fold sample volume was filtered, shows no residue or only traces of residue after washing with cold distilled water.

Upon completion of the reaction, the mixture is standardized by the addition of 1 N hydrochloric acid to a pH of 10.5 and stirred for 10 minutes after the addition of 10 g diatomaceous earth.

The mixture is then drawn off over diatomaceous earth and the filter washed with 70°–80°C warm water until a bright-red filtrate is achieved.

The deep brownish-red filtrate is evaporated in vacuum to a dry state, and the dyestuff residue is dried again in vacuum at 40° to 70°C.

The dyestuff thus obtained is soluble in water and, upon addition of reducing agents, produces yarn and piece dyeings, which, with respect to their coloristic properties, correspond to the dyeings obtained from a sodium sulfide vat by the application of the starting dyestuff used in this example.

The execution of the above reaction at 35 to 40°C instead of at 25°C leads to a product with the same properties, while at 50°–70°C a product is obtained which yields more yellow shades.

EXAMPLE 15

There are mixed well by stirring 580 g of a dyestuff paste, obtained in accordance with Example 3 with a content of 100 g (0.2 mole) of the pure dyestuff, and 100 g of a protective colloid based on a naphthalene-β-sulfonic acid/formaldehyde condensation product and the product is standardized to a pH of 7.5. Subsequently, 100 g sodium sulfide of a purity of 60 to 62% by weight and 100 g of a 33% by weight solution of sodium hydrogen sulfide are added. The mixture is then heated to 90°C and stirred at this temperature for 5 hours. Then, there are added 0.3 g of a fungicide based on o-phenylphenol and 1 g of a complex former of the type represented by ethylene diamine tetraacetic acid.

The solution thus obtained is standardized with distilled water to the desired dye strength. Even with a prolonged standing, no solids separate out.

The solution is employed for the preparation of deeper, uniform yarn and piece dyeings, which, with reference to their coloristic properties, correspond to the dyeings obtained from a sodium sulfide vat by the application of the starting dyestuff employed in this example.

What is claimed is:

1. A process of producing a fast, brown sulfur dyestuff which comprises the steps of dissolving at least one compound of the formula

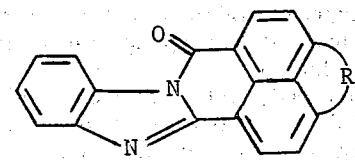

wherein R is

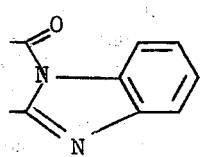 or 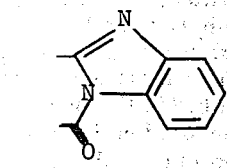

in chlorosulfonic acid or in compositions of chlorosulfonic acid and sulfuric acid whereby up to 70% by weight of the chlorosulfonic acid is replaced by 100% sulfuric acid or oleum with up to 20% free $SO_2$ and reacting resulting solution with a member selected from the group consisting of sulfur and disulfur dichloride at a temperature of from 10° to 120°C. for a reaction time of from 1 to 40 hours.

2. The process of claim 1 wherein chlorosulfonic acid is employed in a weight amount of 7 to 15 times the weight of said at least one compound.

3. The process of claim 1 wherein sulfur is said member selected from said group and is present in an amount of from about 2 to 15 gram atoms per mol of said at least one compound.

4. The process of claim 1 wherein said selected member is disulfur dichloride.

5. The process of claim 1 wherein said selected member is disulfur dichloride which is present in an amount of from 0.5 to 12 mols per mol of said at least one compound.

6. The process of claim 1 wherein said temperature is from 40° to 100°C.

7. The process of claim 1 wherein the dyestuff thereof is treated with aqueous sodium sulfite or sodium hydrogen sulfite to obtain a water-soluble product.

8. The process of claim 1 wherein said reaction time is from 1 to 20 hours.

9. The process of claim 1 wherein the dyestuff thereof is treated with a reducing agent to obtain sulfur dyestuff in the form of the leuco compound of said sulfur dyestuff.

10. The process of claim 9 wherein said reducing agent is sodium formaldehyde sulfoxylate, sodium dithionite or sodium sulfide.

11. The product produced by the process of claim 1.

12. The product produced by the process of claim 1 wherein R is

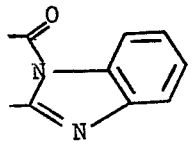

13. The product produced by the process of claim 1 wherein R is

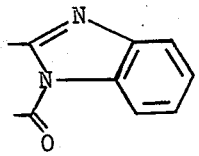

14. The product produced by the process of claim 1 wherein a mixture of said compounds of said formula is employed.

15. The product produced by the process of claim 7.

16. The product produced by the process of claim 11.

17. The product produced by the process of claim 10.

18. The process of claim 1 wherein said selected member is sulfur which is present in an amount of 4 to 12 gram atoms per mol of said at least one compound.

19. The process of claim 1 wherein said selected member is disulfur dichloride which is present in the amount of 1 to 8 mols per mol of said at least one compound.

* * * * *

UNITED STATES PATENT AND TRADEMARK OFFICE
CERTIFICATE OF CORRECTION

PATENT NO. : 3,956,332
DATED : May 11, 1976
INVENTOR(S) : Erwin Krusche, Joachim Ribka and Eberhard Stier It is certified that error appears in the above-identified patent and that said Letters Patent are hereby corrected as shown below:

Col. 1, line 64, "found" should read -- than --;

line 66, "(C.I" should read -- present time --;

line 67, "(C.I." should read -- can be --;

line 68, "generically" should read -- sulfur --.

Signed and Sealed this

Seventh Day of September 1976

[SEAL]

Attest:

RUTH C. MASON
*Attesting Officer*

C. MARSHALL DANN
*Commissioner of Patents and Trademarks*